April 9, 1940.   A. D. STROEHLA ET AL   2,196,569
FRICTION DISK AND METHOD OF MAKING THE SAME
Original Filed Jan. 6, 1936
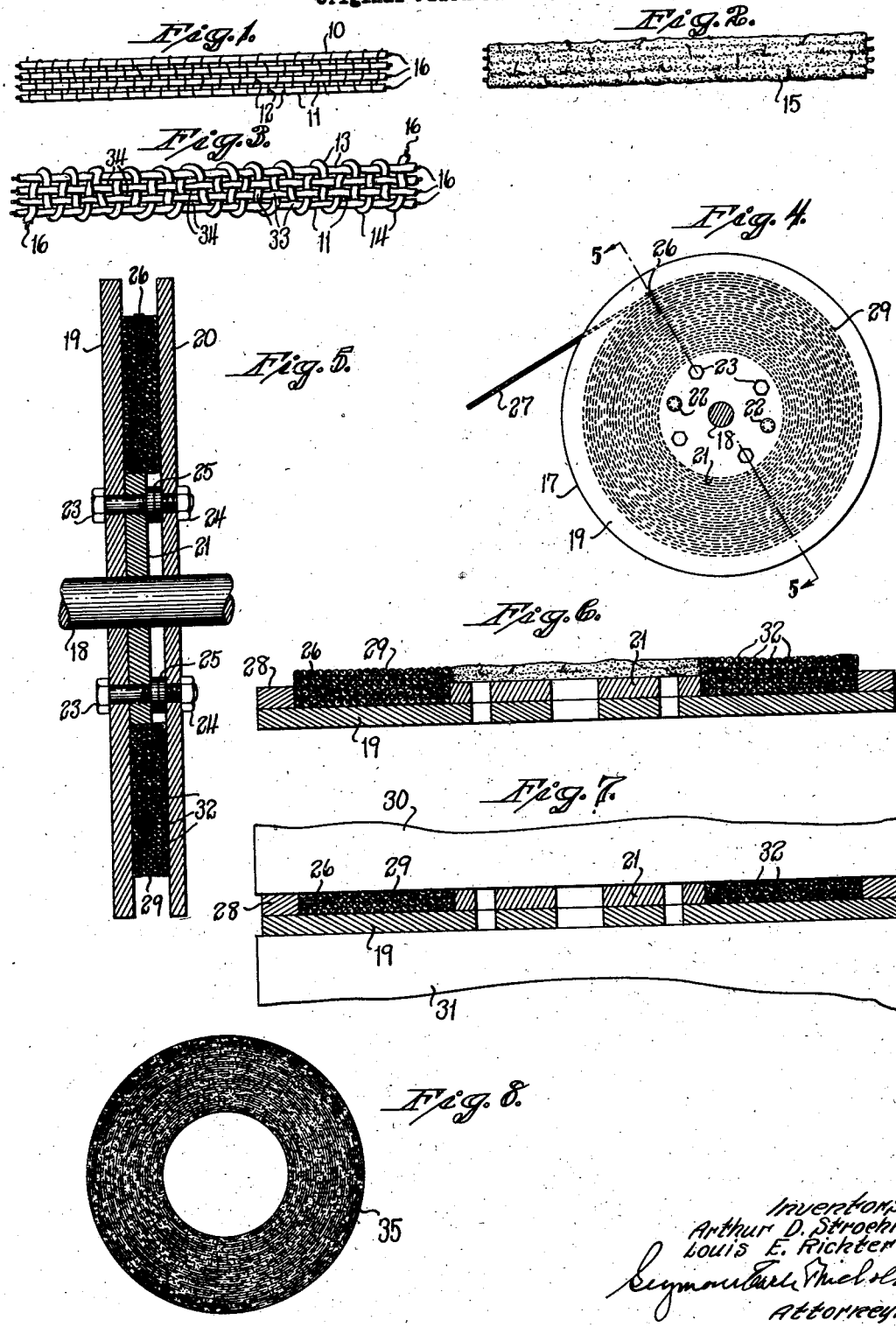
Inventors
Arthur D. Stroehla
Louis E. Richter
Attorneys Patented Apr. 9, 1940

2,196,569

UNITED STATES PATENT OFFICE 2,196,569

FRICTION DISK AND METHOD OF MAKING THE SAME

Arthur D. Stroehla and Louis E. Richter, Middletown, Conn., assignors to The Russell Manufacturing Company, Middletown, Conn., a corporation of Connecticut Continuation of application Serial No. 57,659, January 6, 1936. This application January 21, 1939, Serial No. 252,054

8 Claims. (Cl. 154—2)

This invention relates to improvements in friction disks and methods of making the same, and more particularly to friction disks and methods of making the same, for use in clutches or the like.

This application is a continuation of our application Serial No. 57,659 filed January 6, 1936.

One object of this invention is to provide an improved dense, clutch friction disk having a more uniform coefficient of friction throughout the useful life of the friction disk as the latter is being worn down while in use.

Another object of this invention is to provide an improved clutch friction disk having maximum resistance to bursting by centrifugal force.

Another object of this invention is to provide an improved method of making clutch friction disks.

With the above and other objects in view, this invention includes all improvements over the prior art which are disclosed in the application.

In the accompanying drawing, in which certain ways of carrying out the invention are shown for illustrative purposes:

Fig. 1 is a face view of a fragment of a length of textile-base material, used for making friction disks in accordance with this invention;

Fig. 2 is a view similar to Fig. 1, of the length of textile-base material after it has been treated with a binding or hardening material and prior to the formation of the friction disk;

Fig. 3 is a view similar to Fig. 1, of a length of another form of textile-base material;

Fig. 4 is a diagrammatic side-elevation illustrating one mode of winding a length of material such as is illustrated in Figs. 1 to 3, to form a friction disk in accordance with this invention;

Fig. 5 is an enlarged diagrammatic sectional view taken on the line 5—5 of Fig. 4;

Fig. 6 is a diagrammatic sectional view similar to Fig. 5, but in an angular position of 90° thereto from, and with one of the plates of the winding-reel and the bolts thereof removed, and with an outside sizing or limit-ring added thereto;

Fig. 7 is a diagrammatic view somewhat similar to Fig. 6, after the spirally-wound disk has been axially compressed in forming the spiral disk; and Fig. 8 is a front elevation of a textile-base endless or continuous clutch friction disk made in accordance with this invention.

In the following description and claims, the various parts and steps are identified by specific names for convenience, but they are intended to be as generic in their application as the prior art will permit.

Referring to Fig. 1 of the drawing; fabric in the form of tape 10 is formed of warp strands, yarns or threads 11, and the weft strands or picks 12 formed of wire, such, for example, as brass.

Instead of forming the weft strands of wire, a fabric in the form of tape 13, such as illustrated in Fig. 3, may be formed of similar warp strands 11 and with weft strands or picks 14 of the same material as the warp strands 11. Instead of forming a fabric or tape by weaving, it may be formed by any other of the known methods of interlacing strands such as, for example, by braiding.

If the particular type of friction disk to be made is to have rubber composition in it as the binding or hardening material, the tape 10 or 13 is preferably first saturated with drying oil such, for example, as China-wood oil, and after heating and drying, the tape is impregnated by treating it with a binding or bonding or hardening or vulcanizable material or compound such, for example, as rubber plus fillers, drying oils and/or asphalts, to produce a treated tape such as 15 in Fig. 2. If the friction disk is to be made with synthetic resin instead of rubber-containing materials, then the preliminary impregnation with drying oil may be omitted, the tape 10 or 13 being directly impregnated by treating it with synthetic resin material.

It will be understood that the strands, yarns or threads may be made of any desired material. One such material, for example, may consist of fiber material consisting of, say, eighty-five per cent asbestos fiber, with, say, fifteen per cent cotton fiber for strengthening purposes, although other percentages of these materials may be used.

The warp strands 11 and the weft strands 14, are provided in the examples illustrated in the drawing, with wire cores 16 of copper, aluminum, brass, zinc or other suitable metal.

After a length of tape, such for example as one of the tapes shown in Figs. 1 and 3, has been fully treated or impregnated with binding or hardening material as hereinbefore described, such treated or impregnated tape is wound in the form of a continuous or endless spiral (Fig. 4) on a reel 17 mounted to rotate on an axle 18. The reel 17 may, for example, consist of two opposed large-diameter plates 19 and 20, and a small core or drum-plate 21. Plate 21 may be secured to plate 19 by countersunk rivets 22 or other suitable means, or plates 21 and 19 may be formed integral with each other. The three plates 19, 20 and 21 are firmly clamped together by means of bolts 23 and nuts 24, with the plate 21 spaced from the plate 20 by washers 25. The spacing between the large-diameter outside plates 19 and 20 is provided to be just sufficient to permit the width of the tape to be contained between the plates 19 and 20. After a sufficient amount of the tape has been wound upon the drum-plate 21 to produce a friction disk of desired outside diameter, one or more nails 26 may be driven into the spirally-wound disk to hold the tape from unwinding, or the end of the tape can be held from unwinding by any other suitable means, after which the end-portion 27 (Fig. 4) of the tape is cut off. The nuts 24 are then unscrewed and the bolts 23 and washers 25, together with the plate 20, are removed to leave the remaining parts illustrated in Fig. 6.

If desired, an outside sizing or limit-ring 28 may be placed outside of the crudely-formed disk 29, as shown in Fig. 6, for a purpose to be presently described. The assembly illustrated in Fig. 6 is then subjected to pressure between the dies or pressure-plates 30 and 31 of a press which compresses the disk 29 axially of itself and edgewise of the tape layers or portions 32, to compress the disk as illustrated diagrammatically in Fig. 7. Heat is preferably also applied to the disk 29 in the pressing operation by having the dies 30 and 31 heated, to bring about the hardening and uniformity of the disk.

When the heating and pressing operation illustrated diagrammatically in Figs. 6 and 7 takes place, the binding or hardening material, as is well known to those skilled in the art, softens up to a plastic condition and flows between the strands of the fabric or tape and acts somewhat as a heavy lubricant. This facilitates the shifting of the strands under pressure so that the strand projections or projecting portions such as 33 (Fig. 3) of one convolution of the open-construction fabric or tape, find and sink down into the openings or spaces or interstices or depressions or recesses or recessed portions 34 between the strands of an adjacent convolution to cause the interstices and projections (on opposite sides of a convolution of the fabric) to respectively nest or internest with adjacent projections and interstices of adjacent convolutions of the fabric to cause strand portions of adjacent convolutions to interlock or interengage with each other. The openings in the open-construction fabric also facilitate more perfect penetration of the binding material into the fabric. Where metallic wires are used as shown and described in this application, the metallic wires or strands of adjacent convolutions become interengaged or interlocked with each other during the heating and pressing.

The interlocking or interengaging action greatly increases the resistance of the finished disk to bursting by centrifugal force and to shearing or pulling out at the rivet holes ordinarily drilled through the disk for use in fastening the disk to the clutch plate.

The pressing and heating or baking operations to which the disk will be subjected may, of course, vary in any desired way, and will be varied to suit the particular binding or hardening or impregnating materials used and the service for which the disk is to be used. After the disk is subjected to heat and pressure in the press diagrammatically illustrated in Fig. 7, which pressure may, for example, be as high as several thousand pounds per square inch, the disk may be removed from the restraining forms and press, and subjected to one or more additional treatments of heat and axial pressure between heated dies to increase the infusible state of the binder, at pressure which may, for example, be as low as several hundred pounds per square inch.

After the disk receives its final heat and pressure treatment, it preferably has all of its surfaces ground in the usual manner to the size desired to produce the finished continuous or endless disk 35 shown in Fig. 8.

By impregnating the tapes 18 and 13, for example, with vulcanizable rubber compound, it is possible to bring about substantial uniformity of distribution of the rubber-containing compound throughout the finished disk, which would not be possible if the impregnation were to be performed after the material was wound up into a disk. And by using a tape of a width of several strands to produce an unfinished disk having an axial thickness which is considerably less than the radial thickness of the disk, more effective pressure and more rapid heat penetration can be brought to bear upon the disk with consequent higher density and hardness. By the term "radial thickness" is meant the differences between the radius of the outside edge of the disk and the radius of the inside edge or opening or hole in the disk.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. A clutch friction disk formed of a spirally-wound member formed of interlaced strands at least some of which strands have metallic wires extending therealong, the strands having been treated with heat-hardenable binding material prior to the member being spirally wound, and the spirally-wound member having been subjected to heat and axial pressure to cause its component strands to be compacted into more intimate relationship to form a unitary disk.

2. A clutch friction disk formed of a spirally-wound member formed of strands so interlaced as to provide an open construction, the strands having been treated with heat-hardenable binding material prior to the member being spirally wound, and the spirally-wound member having been subjected to heat and axial pressure to cause its component strands to be compacted into more intimate relationship to form a unitary disk.

3. A clutch friction disk formed of a spirally-wound member formed of interlaced strands at least some of which strands have metallic wires extending therealong, the strands having been treated with heat-hardenable binding material prior to the member being spirally wound, the interlaced strands providing projections and recesses on each of opposite sides of the spirally-wound member such that projections of each convolution nest with recesses of adjacent convolutions of the spirally-wound member, and the spirally-wound member having been subjected to heat and axial pressure to cause it to be compacted into a unitary disk with projections of strands of adjacent convolutions which have metallic wires, interengaged.

4. A clutch friction disk formed of a spirally-wound member formed of strands so interlaced as to provide an open construction, the strands having been treated with heat-hardenable binding material prior to the member being spirally wound, the interlaced strands providing projections and recesses on each of opposite sides of the spirally-wound member such that projections of each convolution nest with recesses of adjacent convolutions of the spirally-wound member, and the spirally-wound member having been subjected to heat and axial pressure to cause it to be compacted into a unitary disk with projections of adjacent convolutions interengaged.

5. The method of making a clutch friction disk comprising: providing a member formed of interlaced strands at least some of which strands have metallic wires extending therealong, the strands having been treated with heat-hardenable binding material; then spirally winding said member into disk-like form; and then subjecting the spirally-wound member to heat and axial pressure to cause its component strands to be compacted into more intimate relationship to form a unitary disk.

6. The method of making a clutch friction disk comprising: providing a member formed of strands so interlaced as to provide an open construction; then treating the open-construction member with heat-hardenable binding material; then spirally winding the treated member into disk-like form; and then subjecting the spirally-wound member to heat and axial pressure to cause its component strands to be compacted into more intimate relationship to form a unitary disk.

7. A clutch friction disk formed of a spirally-wound member formed of strands so interlaced as to provide an open construction, at least some of which strands have metallic wires extending therealong, the strands having been treated with heat-hardenable binding material prior to the member being spirally wound, and the spirally-wound member having been subjected to heat and axial pressure to cause its component strands to be compacted into more intimate relationship to form a unitary disk.

8. A clutch friction disk formed of a spirally-wound member formed of strands so interlaced as to provide an open construction, at least some of which strands have metallic wires extending therealong, the strands having been treated with heat-hardenable binding material prior to the member being spirally wound, the interlaced strands providing projections and recesses on each of opposite sides of the spirally-wound member such that projections of each convolution nest with recesses of adjacent convolutions of the spirally-wound member, and the spirally-wound member having been subjected to heat and axial pressure to cause it to be compacted into a unitary disk with projections of adjacent convolutions interengaged.

ARTHUR D. STROEHLA.
LOUIS E. RICHTER.